United States Patent Office 3,639,353
Patented Feb. 1, 1972

3,639,353
POLYMERS CROSSLINKED WITH
POLYCARBODIIMIDES
Harold P. Brown, Kirkwood, Mo., assignor to The B. F.
Goodrich Company, New York, N.Y.
No Drawing. Continuation-in-part of application Ser. No.
368,395, May 18, 1964. This application Mar. 20, 1970,
Ser. No. 21,488
Int. Cl. C08g 22/00
U.S. Cl. 260—77.5 R
9 Claims

ABSTRACT OF THE DISCLOSURE

Aromatic polycarbodiimides are reacted with polymers containing functional groups solely derived from organic acids. The gelled, crosslinked products are insoluble in alkaline solutions.

CROSS REFERENCES TO RELATED APPLICATIONS

This application is a continuation-in-part of application Ser. No. 368,395, filed May 18, 1964 and now abandoned.

BACKGROUND OF THE INVENTION

It is known in the art to crosslink polymers containing functional groups derived from organic acids with monocarbodiimides, which are materials of the general formula $$R-N=C=N-R'$$

wherein R and R' are each selected from aliphatic, cycloaliphatic and araliphatic radicals. When R and R' are aromatic radicals, the monocarbodiimides so exemplified will not cure polymers containing functional groups solely derived from organic acids unless the mass is heated to 50°–100° C., for about 24 hours. Also, when gels of these polymers are prepared by reaction with monocarbodiimides, the products are found to be soluble in alkaline solutions. It is desired to be able to crosslink polymers containing functional groups solely derived from organic acids to give products that will not be affected by attack of alkaline solutions.

Slowly curing compounds of polymers containing functional groups solely derived from organic acids are useful in forming caulking compounds, sealants, propellant binders and fuels. A slow cure is one which takes place at room temperature over a period of several hours as opposed to a few minutes.

The reactivity of polycarbodiimides toward polymers containing functional groups solely derived from organic acids is generally less rapid than that of the corresponding monocarbodiimides. Poly(dicyclohexylcarbodiimide) will gel a given liquid polymer of 67 parts butadiene, 24.4 parts acrylonitrile and 9.6 parts methacrylic acid at room temperature in 30 minutes to two hours. Monomeric N,N'-dicyclohexylcarbodiimide will gel the same polymer in only one to one and half minutes, a rate that is generally too rapid to allow the use of this material in the manner set forth above.

SUMMARY OF THE INVENTION

It is an unexpected discovery that although aromatic monocarbodiimides do not cure polymers containing functional groups solely derived from organic acids at room temperature, aromatic polycarbodiimides do cure these polymers at room temperature after short periods of time. Furthermore, gels of polymers containing functional groups solely derived from organic acids formed with monocarbodiimide crosslinks are soluble in alkaline solutions whereas gels of similar polymers, but formed with aromatic polycarbodiimide crosslinks, are discovered to be insoluble in alkaline solutions such as ammonium hydroxide. Monomeric N,N'-diphenyl-carbodiimide will not gel a liquid interpolymer of 55 parts butadiene, 25 parts acrylonitrile and 20 parts methacrylic acid at room temperature at all, but poly(diphenyl-carbodiimide) gels this polymer to a tack free state in 1–3 hours at room temperature. Water soluble polymers containing functional groups solely derived from organic acids and dispersions and emulsions of said polymers in water can be crosslinked effectively with water soluble aromatic polycarbodiimides and with dispersed aromatic polycarbodiimides.

The term "aromatic polycarbodiimide" as used herein includes compounds having two or more intralinear carbodiimide groups -(N=C=N)- and corresponding to the general formula -(R—N=C=N)-$_x$ where $x$ is an integer from 2 to 500, and R is a bivalent aromatic organic radical. More specifically the aromatic polycarbodiimides which are useful in this invention are those conforming to the structure -(R—N=C=N)-$_x$ in which R is arylene, said groups containing preferably an aggregate of 6–18 carbon atoms. The most preferred aromatic polycarbodiimides for the purpose of this invention are those in which R is phenylene with one or more substituents ortho to the —N=C=N— group which are sufficiently sizable to retard reactivity of the —N=C=N— group, said substituents including methyl, ethyl, ispropyl, tertiary butyl, neopentyl and the like.

The range of the invention includes polymeric materials of the formula

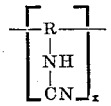

where R and $x$ are defined as above. Said materials have the property of tautomerizing to form polymeric chains with side chain carbodiimide groups

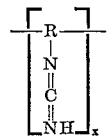

The amount of aromatic polycarbodiimide useful for the purpose of this invention is from 0.01 to 50 parts by weight of the polymer containing functional groups solely derived from organic acids which is to be cross-linked, with from 0.5 to 10 parts being the most preferred range.

Aromatic polycarbodiimides are advantageously employed in combination cures with other known curing systems for polymers containing functional groups solely derived from organic acids. Solid carboxylic butadiene-acrylonitrile compounds are known to be readily cured with zinc oxide. When an aromatic polycarbodiimide is also added to the curing recipe, in addition to the zinc oxide, a combination of features of both curing systems is obtained in the cured materials. The aromatic polycarbodiimide cures also combine with amine cures, sulfur cures, isocyanate cures and epoxy resin cures. The advantages of combining cure systems are particularly apparent when curing liquid polymers containing functional groups solely derived from organic acids at room temperature. A liquid carboxyl-terminated polymer can be cured with epoxy resins, but only with application of heat; the cure will not take place for many days if the compound is merely held at room temperature. If aromatic polycarbodiimide is combined with the polymer along with epoxy resin, the polycarbodiimide cure will be effected in a few hours at room temperature producing a firm solid mass. With further aging at room temperature, the epoxy resin cure fully develops and a preferred balance of physical properties of the cured polymer results.

The arylene and polycarbodiimides are readily prepared as described in United States Pat. 2,941,966, by heating an organic arylene diisocyanate with a catalyst. The reaction may be illustrated as follows:

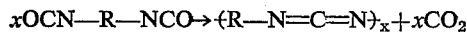

wherein R is a bivalent organic arylene radical and $x$ is an integer greater than 1. Any arylene organic polyisocyanate, that is, any such organic compound containing two or more free isocyanate groups, may be used to prepare the polycarbodiimides. The organic polyisocyanates may contain substituent groups, but these substituent groups should not be reactive with isocyanate groups. Preferred catalysts include phospholines, phospholine oxides and sulfides, and phospholidine oxides and sulfides. Reaction occurs between the isocyanate groups to form a plurality of carbodiimide linkages with the liberation of carbon dioxide. If mixtures of two or more organic diisocyanates are used in the reaction, the bivalent organic radical R in the formula

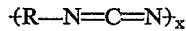

will not be the same in each recurring unit. When prepared from organic arylene diisocyanates, the polycarbodiimides are substantially linear.

Representative organic arylene diisocyanates which may be used include 2,4-toluene diisocyanate, m-phenylene diisocyanate, 1,3-diisopropyl-phenylene - 2,4 - diisocyanate, 1-methyl-3,5-diethyl-phenylene diisocyanate, 4,4'-methylene(di-p-phenylene) diisocyanate, 4 - chloro-1,3-phenylene diisocyanate, 4,4'-biphenylene diisocyanate, 1,5-naphthylene diisocyanate, and 1,5-tetrahydronaphthylene diisocyanate.

Organic triisocyanates, such as 2,4,6-triisocyanato-toluene and p-isocyanatophenyl 2,4-diisocyanatophenyl ether may be used to prepare aromatic polycarbodiimides within the scope of the present invention. With the use of triisocyanates, the resulting polymers contain a plurality of carbodiimide linkages, are of high molecular weight, and are substantially crosslinked. In general, uncrosslinked aromatic polycarbodiimides formed from diisocyanates, are preferred.

Polymers containing functional groups solely derived from organic acids are linear synthetic polymers containing at least 0.005 chemical equivalent by weight of organic acid hydrogen, and no other functional groups, for each 100 parts by weight of polymer said polymers having molecular weights greater than 500. They can be either liquid or solid at room temperature. The polymeric backbone of the polymer may be hydrocarbon, polyether or polyester in composition. The organic acid-containing polymers useful in this invention can be made by standard emulsion, solution and bulk polymerization techniques. The emulsion recipes used to prepare said interpolymers consist of the mixture of monomers, suitable emulsification and suspension agents, buffering agents for pH control and free radical catalysts of the peroxide type such as benzoyl peroxide, hydroperoxides such as di-t-butyl peroxide, diazo components such as azobisisobutyronitrile and redox materials such as persulfate-sulfite types or mixtures of the above catalysts. Polymerization may be carried out in the presence of a free radical catalyst in a closed vessel in an inert atmosphere and under autogeneous pressure or artificially induced pressure or in an open vessel under reflux at atmospheric pressure. The temperatures of the polymerization may be varied from 0° C. or lower to 100° C. or higher, more preferably from 20° C. to 90° C., depending to a large degree upon the activity of the monomers and catalyst used and the molecular weight desired in the polymeric product. The conditions and catalysts used in solution polymerization are similar to those used in the emulsion systems. Polymers made in solution are sometimes soluble end products and in some cases the polymers precipitate from the polymerization medium as they form. Bulk polymerizations are carried out by adding catalyst to the monomer mixture and causing them to polymerize in the absence of a diluent. Liquid polymers used in this invention are prepared by the standard techniques mentioned above with the inclusion of chemical modifiers or chain transfer agents which are exemplified by mercaptans, sulfides, disulfides, bromotrichloromethane, dibromodichloromethane, cumene, and xylene. The technique of making such liquid polymers is known in the art.

Liquid carboxyl-terminated polymers which have their carboxyl groups as terminal functional groups rather than scattered at random positions along the polymer chain are also known and can be prepared by polymerizing monomers in the presence of end group-introducing initiators and modifiers with a bis-type structure. In such polymerizations, the favored solvent is methanol, the favored initiator is 4,4'-azo-bis-(4-cyanovaleric acid) and the favored modifier is dithiobutyric acid, as described in German Pat. 1,150,205.

The term "organic acid" for the purposes of this invention is defined as a grouping which contains an organic acidic ionizable hydrogen. Examples of functional groups which contain organic acidic ionizable hydrogen are the carboxylic acid, phosphonic acid, sulfonic acid and sulfhydryl groups. These groups may occur as functional end groups or scattered randomly along the polymer chain, or both.

The polymers containing organic acidic ionizable hydrogen which are useful in this invention can be more specifically defined as interpolymers of at least one unsaturated monomer, at least one of which is an alpha-beta olefinically unsaturated organic acid as defined above. Examples of alpha-beta olefinically unsaturated organic acids are acrylic acid, alpha-alkyl substituted acrylic acids said alkyl groups containing from 1 to 6 carbon atoms, alpha-halogenated acrylic acids such as alpha-fluoro, alpha-chloro, alpha-bromo and alpha-iodo acrylic acids, alpha-cyano acrylic acid, alpha-phenyl acrylic acid, alpha-(nuclear halogenated phenyl) acrylic acids, maleic acids, alkyl substituted maleic acids said alkyl groups containing 1 to 6 carbon atoms, fumaric acid, alkyl substituted fumaric acids said alkyl groups containing 1 to 6 carbon atoms, crotonic acid, cinnamic acid, nuclear carboxylated styrenes, nuclear carboxylated alpha-alkyl styrenes said alkyl groups containing 1 to 6 carbon atoms, nuclear sulfonated styrenes, nuclear sulfonated alpha-alkyl styrenes said alkyl groups containing 1 to 6 carbon atoms and alpha- and beta-sulfonated acrylic acids.

Other monomers used in forming interpolymers useful in this invention are butadiene, 2-alkyl butadienes said alkyl groups containing at least one and not more than six carbon atoms, 2,3-dialkyl butadienes said alkyl groups containing 1 to 6 carbon atoms, 2-halobutadienes, piperylenes, isobutylene, acrylate esters of aliphatic alcohols having 1 to 12 carbon atoms, methacrylate esters of aliphatic alcohols having from 1 to 12 carbon atoms, acrylonitrile, methacrylonitrile, vinylidene cyanide, vinyl halides such as vinyl fluoride, vinyl chloride and vinyl bromide, styrene, alphaalkyl styrenes said alkyl groups containing 1 to 6 carbon atoms and nuclear alkylated styrenes said alkyl groups containing 1 to 6 carbon atoms.

The preferred polymers for use in this invention are carboxylic-terminated polybutadiene, carboxylic terminated butadiene-methacrylic acid, carboxylic-terminated butadiene-acrylonitrile, carboxylic-terminated butadiene-acrylonitrile-methacrylic acid, polyacrylic acid, partially hydrolyzed polyacrylonitrile having at least .005 equivalent of carboxyl hydrogen. Also useful are interpolymers of acrylate esters and acrylic acid, acrylate esters and methacrylic acid, acrylate esters and methacrylic acid and acrylic acid, butadiene and methacrylic acid, butadiene and acrylic acid, butadiene and styrene and methacrylic acid, butadiene and acrylonitrile and methacrylic acid, chloroprene and acrylic acid, chloroprene and methacrylic acid, butadiene and acrylonitrile and ethylene sulfinic acid, and poly-alpha-sulfonylated acrylic acid. The preferred acrylate and methacrylate esters are the lower alkyl esters or those having an alkyl alcohol moiety having from 1 to about 8 carbon atoms. The proportions of the monomeric ingredients may be varied in any order providing at least .005 chemical equivalent by weight of organic acid ionizable hydrogen are incorporated into each 100 grams of polymer having a molecular weight of at least 500. The polymers have no functional groups, such as amino groups, other than acidic ionizable hydrogen.

An object of this invention is the production of novel crosslinked polymeric compositions ranging from gel-like masses to tightly cured rubbery products. It is a further object of this invention to provide a means for converting synthetic organic acid-containing polymers to these novel gel-like masses and tightly cured rubbery products at room temperature by treating said organic acid-containing polymers with aromatic polycarbodiimides. Another object is to provide crosslinked synthetic organic acid-containing polymers which have alkaline insensitivity.

The exact mechanism of the crosslinking which takes place in the reaction between the polymers containing acid ionizable hydrogen derived solely from organic acids and aromatic polycarbodiimides in this invention is not known, but the polycarbodiimide chain is believed to react with the acid ionizable hydrogen in the base polymer chain functional groups. When the acid groups are in terminal or near terminal positions on the polymer chains, reaction with the polycarbodiimides results in chain extension as well as crosslinking.

The crosslinked compositions of this invention vary in physical character from loosely crosslinked gels to tightly cured products depending upon the molecular weight of the original polymer containing function groups solely derived from organic acids which is used, the proportion of acidic ionizable hydrogen in said polymer, and the proportions of aromatic polycarbodiimide to polymer used in the reaction. When low molecular weight (500–2,000) liquid polymers are used as the starting materials, the products of reaction with aromatic polycarbodiimides will vary from loose gels through the "cheesy" stage to rubbery masses depending upon the character of the starting polymer.

The crosslinked compositions embodied in this invention may be made from solid polymers containing functional groups solely derived from organic acids by conventional milling and curing techniques with the less reactive aromatic polycarbodiimides. Liquid synthetic polymers containing functional groups solely derived from organic acids are compounded and cast in molds and subsequently cured with aromatic polycarbodiimides to produce infusible solid, rubbery and gel-like articles conforming to the shape of the mold.

Solutions of solid polymers containing functional groups solely derived from organic acids and similar undiluted liquid polymers are coated on surfaces and subsequently treated with aromatic poly-carbodiimides to produce cured protective and decorative films. Porous articles including those composed of wood, ceramics, leather and paper can be impregnated with solutions of solid polymers containing functional groups solely derived from organic acids and similar undiluted liquid polymers and the resulting products can be cured by treatment of the impregnated article with desired aromatic polycarbodiimides.

Benzene, toluene, xylene, hexane, methyl ethyl ketone and similar types of organic solvents are thickened by the addition of the proper amount of an aromatic polycarbodiimide to a solution of a polymer containing functional groups solely derived from organic acids in one of said types of solvents. Forms which have been coated with aromatic polycarbodiimides can be dipped into latexes, liquid polymers or a solution of a polymer containing functional groups derived solely from organic acid in an organic solvent in such a manner that a cured film of the polymer conforming to the shape of the form results when the form is withdrawn from the dipping medium. Compounded articles are readily made in this manner. The mixtures of liquid polymers containing functional groups derived solely from organic acids and aromatic polycarbodiimides described herein are useful as caulking compounds, putties, binders for solid fuels, binders for non-woven articles made from cotton fibers, wool fibers, synthetic fibers, asbestos fibers, leather dust and wood dust, for sealing porous articles, and for enhancing water and oil resistance of leathers and fabrics.

It is possible to retard the rate of cure of these polymers with aromatic polycarbodiimides by incorporation of small quantities of amines including triethyl amine, triamyl amine, dodecyl amine, hexamethylene diamine and ammonia into the mixture of polymer and polycarbodiimide. The volatile amines such as triethyl amine and ammonia are particularly advantageous for use in coating, dipping and painting applications because the speed of cure can be retarded by the selection of an amine which vaporizes at the proper rate. Also, the curing rate of normally slow reacting aromatic polycarbodiimides can be accelerated in any of the above processes by heating to a temperature of 50–200° C. the substances that have been treated with the aromatic polycarbodiimides.

DETAILED DESCRIPTION

The proportions of ingredients are given in parts by weight, unless otherwise specified.

Example I

Four-tenths mol of phenylisothiocyanate and two tenths mol of hexamethylene diamine are dissolved in 400 ml. of benzene. The mixture is refluxed for one hour with stirring. The filtered product, 1,6-diphenylthiourea hexane is recovered as a white, crystalline solid.

One-tenth mol of the prepared bis-thiourea, 0.25 mol of yellow mercuric oxide, and 0.24 mol of anhydrous sodium sulfate are mixed in 380 ml. of tetrahydrofuran. The mixture is heated under reflux and nitrogen for 30 minutes. The cooled, filtered product is analyzed and found to be bis(phenyl-propylene carbodiimide) or 1,6-diphenylcarbodiimido hexane. This compound is a bis carbodiimide, and is representative of the simplest form of a polycarbodiimide, conforming to the formula $(C_6H_5-N=C=N-R-)_2$ where R is the divalent, trimethylene group.

A carboxylic butadiene/acrylonitrile polymer, analyzing 0.09 ephr. of carboxyl, is prepared as a 50% by weight solution in tetrahydrofuran. Slightly more than a theoretical equivalent of the prepared, 1,6-diphenylcarbodiimido hexane is added. After 15 minutes at room temperature gelation occurs. The gel is non-sticky, but soft and rubbery.

The gelled polymer is divided in half. One part is placed in distilled water; the other in 2/1 ammonium hydroxide/water. After 72 hours the polymer is unchanged; it is stable to water and alkali.

When an equivalent of N,N'-diisopropylcarbodiimide, a monomeric material, is used to gel the carboxylic copolymer, the cured material is softened, degraded and reliquefied by immersion in 10% ammonium hydroxide for 24 hours.

When chemical equivalents of the carboxylic butadiene/acrylonitrile copolymer and N,N'-diphenylcarbodiimide, N,N' - di - o - tolylcarbodiimide, or N - phenyl, N'-isopropylcarbodiimide are mixed, no gel or evidence of crosslinking occurs after 48 hours at room temperature. Gel is observed only after several hours, i.e. about 24, heating in the 50° C. oven. The same is true when twice the equivalent amount of the N,N'-diphenylcarbodiimide is added to the carboxylic copolymer.

When chemical equivalents of the carboxylic butadiene/ acrylonitrile copolymer and N,N'-dicyclohexylcarbodiimide, or an excess of the latter, are mixed at room temperature, gelation occurs in less than five minutes. This gelled polymer is divided in half. One part is placed in distilled water; the other in 2/1 ammonium hydroxide/ water. After 24 hours slight disintegration of the gel in water is evident. Disintegration of the gel in ammonium hydroxide/water is complete, the polymer being reliquefied and partially dissolved.

This example shows that aromatic monocarbodiimide will not cure a polymer containing functional groups solely derived from organic acid at room temperature whereas an aliphatic monocarbodiimide cures the same polymer in a matter of minutes. The example further shows that aliphatic monocarbodiimides cure the polymers rapidly, but that the cured materials are sensitive to alkaline solutions while crosslinked polymers formed from aromatic polycarbodiimide cure are insensitive to alkaline immersion.

Example II

An aromatic polycarbodiimide, poly(1 - methyl - 3,5-diisopropyl - 2,4 - phenylcarbodiimide), with a molecular weight of about 1720, prepared as described above by heating 3,5 - diisopropyl - 2,4 - tolylene diisocyanate with 3 - methyl - 1 - phenyl - 3 - phospholine, is employed as a crosslinker for an ethyl acrylate/acrylic acid-methacrylic acid, 95/2.5/2.5 terpolymer.

Ten grams of the carboxylic polyethylacrylate (0.065 ephr of carboxyl) are dissolved in methylethylketone to form a 50 weight percent solution. Next, 0.5 gram of the aromatic polycarbodiimide is dusted into the solution. After 24 hours, the polymer is crosslinked; no liquid is present. Aromatic polycarbodiimides initiate room temperature cures in liquid polymers containing functional groups solely derived from organic acid.

Example III

Ten grams of carboxylic polyethylacrylate (0.065 ephr carboxyl) are prepared as 50 weight percent solution in methylethylketone. Then 1.25 grams of poly(1-methyl-3, 5 - diisopropyl - 2,4 - phenylcarbodiimide), mol wt. 1720, in 10 grams methylethylketone are added. After two hours there is no heat evolution and no sign of cure. After five hours the mixture is thick, like molasses. After 5½ hours there is no flow when the container is inverted. After 7 hours the reaction mixture is jelly-like. After 24 hours, the mixture has the appearance of art-gum. It is crumbly, but does not adhere to a glass rod.

The cured polymer is divided into 4 equal parts and placed:

(A) in air in an uncapped jar
(B) covered with distilled water
(C) covered with 15% ammonium hydroxide
(D) covered with 30% ammonium hydroxide After 17 days the samples show no signs of swelling or disintegration.

An attempt to cure the polymer with monomeric 2,6-diethyl phenylcarbodiimide gives no cure at room temperature after 48 hours.

Polymeric aromatic carbodiimide initiates room temperature cures in polymer containing functional groups solely derived from organic acid and monomeric aromatic carbodiimide fails to initiate a cure under the same conditions.

Example IV

A liquid carboxyl-terminated polybutadiene is prepared by polymerizing 100 parts butadiene and 4 parts azodicyanovaleric acid in 100 parts tertiary butanol in a bottle polymerizer for 8.6 hours at 75° C. The polymer has a functionality of 2 indicating the terminal groups of the molecules are both carboxyl. To a batch of 100 parts of this polymer is added 10 parts aromatic polycarbodiimide dissolved in 10 parts dibutyl phthalate, a plasticizer. The mixtures are allowed to stand overnight at room temperature, and tack free, solid polymers are formed.

| | Tensile strength, lbs sq. in. | Percent elongation at break | Shore A hardness |
|---|---|---|---|
| A. Polymer plus poly(trialkyl-1,3-phenyl-carbodiimide) in which the alkyl groups are methyl, ethyl and isopropyl, with the major proportion being isopropyl. | 140 | 720 | 32 |
| B. Polymer plus poly(1,3-dialkyl-2,4-phenylcarbodiimide) in which the alkyl groups are methyl and isopropyl, the major proportion being isopropyl | 250 | 270 | 50 |

When 10 parts of the aromatic polycarbodiimide employed in B plus 10 parts dibutyl phthalate are added to 100 parts of a carboxyl-terminated polymer of butadiene-acrylonitrile, a tack free material forms in 3 hours at room temperature.

Example V

Solid carboxylmodified butadiene-acrylonitrile copolymer analyzing 0.065 ephr is prepared as a 20% total solids cement in methylethylketone. Poly(trialkyl-1,3-phenyl-carbodiimide) in which the alkyl groups are methyl, ethyl and isopropyl, with the major proportion being isopropyl, is added and thoroughly mixed by roll milling for 30 minutes. A wet film is cast on a glass plate using a 25 mil drawbar. The film is dried overnight at room temperature. Type C dumbbells are pulled on an Instron Tensile Test Machine at 20′ crosshead speed.

| Parts aromatic polycarbodiimide | Tensile strength, p.s.i. | Percent elongation |
|---|---|---|
| 3 | 260 | 1,010 |
| 5 | 460 | 490 |

When the butadiene/acrylonitrile copolymer containing approximately the same proportions of these monomers as the above copolymer, but with no carboxyl modification and analyzing 0.0 e.p.hr. is similarly prepared as a 20% total solids cement in methylethylketone, no cure is obtained at room temperature when 5 parts per hundred parts of polymer of the aromatic polycarbodiimide are added and the mixture is allowed to stand for 24 hours. This demonstrates that organic acidic hydrogen must be present in the polymer in order to effect a cure with aromatic polycarbodiimides.

Example VI

Carboxyl-terminated polyethyl acrylate and polybutyl acrylate (both of MW about 6,000) are cured to tack free polymers in 16 hours with 10 parts per hundred of polymer of the aromatic polycarbodiimide used in Example V. When the same polymers are mixed with 10 parts of o-tolylcarbodiimide, a monomeric aromatic material, no cure is seen even after heating 24 hours at 50° C.

Two gram samples of the cured polyalkyl acrylates are covered with a solution of 2/1 concentrated ammonium hydroxide/water and allowed to stand for one week. No deterioration, softening or other evidence of cure degradation is observed.

Example VII

A solid carboxylic polymer of butadiene, acrylonitrile and methacrylic acid, analyzing 0.065 e.p.hr. is compounded in units of 100 parts with 40 parts FEF carbon black and A, no additive (control), B, 0.5 part poly(trialkyl-1,3-phenylcarbodiimide) in which the alkyl groups are methyl and isopropyl, with the major proportion being isopropyl, C, 3.5 parts of polycarbodiimide and D, 7.0 parts polycarbodiimide. The materials are mixed on a cold mill and the batches are cured 20 minutes at 330° F.

| Sample | A | B | C | D |
|---|---|---|---|---|
| 300% mol p.s.i. | 234 | 425 | 1,665 | |
| Tensile, p.s.i. | 420 | 1,025 | 3,665 | 2,625 |
| Elongation, percent | 1,460+ | 955 | 615 | 265 |

The data show that aromatic polycarbodiimides are effective vulcanization agents for rubber polymer containing functional groups solely derived from organic acid.

I claim:

1. A crosslinked reaction product of a linear synthetic polymer containing functional groups, said groups containing at least 0.005 chemical equivalent by weight of organic acid hydrogen, derived solely from organic acid, plus an aromatic polycarbodiimide, said polycarbodiimide being a curing agent for said polymer, said polymer being an interpolymer of at least one unsaturated monomer, at least one of which is an alpha-beta olefinically unsaturated organic acid.

2. A crosslinked reaction product of a linear synthetic polymer containing functional groups, said groups containing at least 0.005 chemical equivalent by weight of organic acid hydrogen, derived solely from organic acid, plus an aromatic polycarbodimide conforming to the structure $\{R\!-\!N\!=\!C\!=\!N\}_x$ wherein R is an arylene hydrocarbon radical having from 6 to 18 carbon atoms and x is an integer from 2 to 500, said polycarbodiimide being a curing agent for said polymer, said polymer being an interpolymer of at least one unsaturated monomer, at least one of which is an alpha-beta olefinically unsaturated organic acid.

3. A crosslinked reaction product of a linear synthetic polymer containing functional groups, said groups containing at least 0.005 chemical equivalents by weight of organic acid hydrogen, derived solely from organic acid, plus an organic polycarbodiimide conforming to the structure $\{R\!-\!N\!=\!C\!=\!N\}_x$ wherein R is phenylene and x is an integer from 2 to 500, said polycarbodiimide being a curing agent for said polymer, said polymer being an interpolymer of at least one unsaturated monomer, at least one of which is an alpha-beta olefinically unsaturated organic acid.

4. A crosslinked reaction product of a linear synthetic polymer containing functional groups, said groups containing at least 0.005 chemical equivalents by weight of organic acid hydrogen, derived solely from organic acid, plus an aromatic polycarbodiimide conforming to the structure $\{R\!-\!N\!=\!C\!=\!N\}_x$ wherein R is phenylene and x is an integer from 2 to 500, said phenylene having substituents ortho to the $-N\!=\!C\!=\!N-$ group, said polycarbodiimide being a curing agent for said polymer, said polymer being an interpolymer of at least one unsaturated monomer, at least one of which is an alpha-beta olefinically unsaturated organic acid.

5. A crosslinked reaction product of a linear synthetic polymer containing functional groups, said groups containing at least 0.005 chemical equivalent by weight of organic acid hydrogen, derived solely from organic acids and an aromatic polycarbodiimide conforming to the structure $\{R\!-\!N\!=\!C\!=\!N\}_x$ wherein R is phenylene and x is an integer from 2 to 500, said phenylene having substituents ortho to the $-N\!=\!C\!=\!N-$ group selected from the group consisting of methyl, ethyl, isopropyl, tertiary butyl, and neopentyl, said polycarbodiimide being a curing agent for said polymer, said polymer being an interpolymer of at least one unsaturated monomer, at least one of which is an alpha-beta olefinically unsaturated organic acid.

6. A crosslinked composition consisting of the reaction product of (1) an essentially linear synthetic polymer selected from the group consisting of polyacrylic acid, polymethacrylic acid, partially hydrolyzed polyacrylonitrile, carboxylic-terminated polybutadiene, an interpolymer of an acrylate ester and acrylic acid, an interpolymer of an acrylate ester and methacrylic acid wherein the alcohol moieties of said acrylate ester have from 1 to 8 carbon atoms, and an interpolymer of butadiene, acrylonitrile and methacrylic acid, said polymer containing at least 0.005 chemical equivalent by weight of organic acid hydrogen for each 100 parts by weight of polymer, said polymer having a molecular weight greater than 500, and (2) an aromatic polycarbodiimide conforming to a structure selected from the group consisting of $\{R\!-\!N\!=\!C\!=\!N\}_x$, and

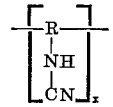

wherein R is phenylene, said phenylene having substituents ortho to the $-N\!=\!C\!=\!N-$ group selected from the group consisting of methyl, ethyl, isopropyl, tertiary butyl and neopentyl, x is an integer from 2 to 500, said polycarbodiimide being a curing agent for said polymer.

7. A process for crosslinking a linear synthetic polymer containing functional groups, said groups containing at least 0.005 chemical equivalents by weight of organic acid hydrogen, derived solely from organic acids comprising bringing together said polymer and an aromatic polycarbodiimide at ambient conditions whereby said polymer is crosslinked through said functional groups, said polymer being an interpolymer of at least one unsaturated monomer, at least one of which is an alpha-beta olefinically unsaturated organic acid.

8. A process for crosslinking a linear synthetic polymer containing functional groups, said groups containing at least 0.005 chemical equivalents by weight of organic acid hydrogen, derived solely from organic acid comprising bringing together a solution of said polymer in an organic solvent and an aromatic polycarbodiimide at room temperature whereby said polymer becomes crosslinked by reaction with said polycarbodiimide through said functional groups, said polymer being an interpolymer of at least one unsaturated monomer, at least one of which is an alpha-beta olefinically unsaturated organic acid.

9. A process for crosslinking a linear synthetic polymer containing functional groups, said groups containing at least 0.005 chemical equivalents by weight of organic acid hydrogen, derived solely from organic acids comprising bringing together a solution of said polymer in an organic solvent and a solution of an aromatic polycarbodiimide in an organic solvent at ambient conditions whereby said polymer becomes crosslinked through said functional groups by reaction therewith of said polycarbodiimide, said polymer being an interpolymer of at least one unsaturated monomer, at least one of which is an alpha-beta olefinically unsaturated organic acid.

References Cited

UNITED STATES PATENTS 2,937,164  5/1960  Brown et al. _____ 260—80.7
2,941,966  6/1960  Campbell _____ 260—2.5

OTHER REFERENCES

Campbell et al., J. Org. Chem. 28 (8), pp. 2060–75, 1963.

DONALD E. CZAJA, Primary Examiner

M. WELSH, Assistant Examiner